United States Patent
Hill et al.

(10) Patent No.: US 8,324,858 B2
(45) Date of Patent: Dec. 4, 2012

(54) CHARGING STATIONS FOR ELECTRIC VEHICLES

(75) Inventors: Dale Hill, Evergreen, CO (US); Michael Walker, Thornton, CO (US); Joshua Goldman, San Diego, CA (US); John Horth, Evergreen, CO (US)

(73) Assignee: Proterra Inc., Greenville, SC (US)

( * ) Notice: Subject to any disclaimer, the term of this patent is extended or adjusted under 35 U.S.C. 154(b) by 487 days.

(21) Appl. No.: 12/496,569

(22) Filed: Jul. 1, 2009

(65) Prior Publication Data

US 2010/0039067 A1     Feb. 18, 2010

Related U.S. Application Data

(60) Provisional application No. 61/077,452, filed on Jul. 1, 2008, provisional application No. 61/174,926, filed on May 1, 2009.

(51) Int. Cl.
   *H02J 7/00*     (2006.01)
   *B60M 1/34*     (2006.01)
   *E04H 6/00*     (2006.01)
   *B60K 1/04*     (2006.01)

(52) U.S. Cl. ............ 320/109; 320/107; 180/2.1; 180/60; 180/65.1; 180/312; 191/23 A; 191/33 R; 191/41; 903/903; 903/904; 903/906; 903/907; 414/227; 104/34

(58) Field of Classification Search .................. 320/109; 191/23 A, 33 R, 41; 104/34
See application file for complete search history.

(56) References Cited

U.S. PATENT DOCUMENTS

| | | | |
|---|---|---|---|
| 3,955,657 A * | 5/1976 | Bossi | 191/2 |
| RE29,994 E | 5/1979 | Bossi | |
| 4,158,802 A | 6/1979 | Rose | |
| 4,357,501 A * | 11/1982 | Clerc | 191/83 |
| 5,315,227 A | 5/1994 | Pierson et al. | |
| 5,464,082 A * | 11/1995 | Young | 191/2 |
| 5,498,948 A | 3/1996 | Bruni et al. | |
| 5,592,883 A | 1/1997 | Andress | |
| 5,651,434 A * | 7/1997 | Saunders | 191/2 |
| 5,847,537 A | 12/1998 | Parmley, Sr. | |
| 6,557,476 B2 * | 5/2003 | Batisse | 104/289 |
| 6,864,598 B2 | 3/2005 | Nogaret et al. | |
| 6,994,931 B2 | 2/2006 | Ichikawa et al. | |
| 6,995,480 B2 | 2/2006 | Amano et al. | |
| 7,549,521 B2 * | 6/2009 | Aisenbrey | 191/29 DM |

(Continued)

FOREIGN PATENT DOCUMENTS

EP     0575248 A1     12/1993
(Continued)

OTHER PUBLICATIONS

International search report dated Jan. 19, 2010 for PCT Application No. US2009/49448.

(Continued)

*Primary Examiner* — Drew A Dunn
*Assistant Examiner* — Nathaniel Pelton
(74) *Attorney, Agent, or Firm* — Wilson Sonsini Goodrich & Rosati

(57) ABSTRACT

The invention relates to systems and methods for charging a vehicle. A vehicle and charging station can be designed such that an electric or hybrid vehicle can operate in a fashion similar to a conventional vehicle by being opportunity charged throughout a known route.

27 Claims, 10 Drawing Sheets

U.S. PATENT DOCUMENTS

| | | |
|---|---|---|
| 2002/0132144 A1 | 9/2002 | McArthur et al. |
| 2007/0062771 A1* | 3/2007 | Li .................................... 191/50 |
| 2007/0182247 A1 | 8/2007 | Kim et al. |
| 2008/0052145 A1 | 2/2008 | Kaplan |
| 2008/0203973 A1 | 8/2008 | Gale et al. |
| 2008/0277173 A1 | 11/2008 | Midrouillet et al. |
| 2009/0062967 A1 | 3/2009 | Kressner et al. |
| 2009/0115368 A1* | 5/2009 | Bullis ............................ 320/101 |
| 2009/0308667 A1* | 12/2009 | Westerdaard ................... 180/6.7 |
| 2010/0044123 A1* | 2/2010 | Perlman et al. ................. 180/2.1 |
| 2010/0060016 A1* | 3/2010 | Hunter ........................... 290/1 R |
| 2010/0102775 A1* | 4/2010 | Chander et al. ............... 320/109 |

FOREIGN PATENT DOCUMENTS

| | | |
|---|---|---|
| EP | 0575248 B1 | 12/1993 |
| EP | 1356981 A2 | 10/2003 |
| EP | 1997668 A1 | 12/2008 |
| EP | 2014505 A1 | 1/2009 |
| JP | 06-086407 A | 3/1994 |
| KR | 10-2005-0012106 | 1/2005 |
| WO | WO 2007/045792 A2 | 4/2007 |
| WO | WO 2007/045792 A3 | 11/2007 |
| WO | WO 2008/105434 A1 | 9/2008 |
| WO | WO 2008/107767 A2 | 9/2008 |
| WO | WO 2008/107767 A3 | 12/2008 |
| WO | WO 2009/001788 A1 | 12/2008 |
| WO | WO 2009/014543 A1 | 1/2009 |

OTHER PUBLICATIONS

International search report and written opinion dated Aug. 24, 2011 for PCT Application No. US2010/061862.

* cited by examiner

CHARGING STATIONS FOR ELECTRIC VEHICLES

CROSS-REFERENCE

This application claims the benefit of U.S. Provisional Application No. 61/077,452, filed Jul. 1, 2008, and U.S. Provisional No. 61/174,926, filed May 1, 2009, which applications are incorporated herein by reference in their entirety.

STATEMENT AS TO FEDERALLY SPONSORED RESEARCH

This invention was made with the support of the United States government under the National Fuel Cell Bus program, Project ID numbers GA-04-7001, GA-04-7002 by the Federal Transit Administration (FTA).

BACKGROUND OF THE INVENTION

Electric vehicles are limited by current infrastructure for transferring power to the electric vehicles. Some electric vehicles, such as electric trains and light rail cars, are permanently connected to a power source through hardware in the railing or through overhead lines. Other electric vehicles, such as electric cars, are charged by plugging in the electric vehicle at a charging station.

While systems for maintaining a permanent electrical connection along a route taken by an electric vehicle can be used to transfer power to the electric vehicle, these systems are an eyesore, are unpopular, are costly to install and maintain, and can be unsafe. These systems often require the entire electric bus line to be suspended for periods of time while cities perform routing building maintenance or construction. Some of these systems do not enable an electrical vehicle to run independent of a railing or overhead line. Also, some of these systems are not adaptable to different vehicles with different characteristics. Furthermore, these systems may take a significant amount of time or effort to charge.

Thus, there is a need to develop improved systems and methods for charging electric vehicles.

SUMMARY OF THE INVENTION

The invention provides systems and methods for charging an electric or hybrid electric vehicle. Various aspects of the invention described herein may be applied to any of the particular applications set forth below or for any other types of vehicles. The invention may be applied as a standalone system or method, or as part of an integrated transportation system, such as a bus system or other public transportation system. It shall be understood that different aspects of the invention can be appreciated individually, collectively, or in combination with each other.

One aspect of the invention may be directed to a charging station. A charging station may include a charging mount. A charging station may also include two or more collector braces, where each collector brace includes at least one electrically conductive surface area, such as a conductive pad. Preferably, each collector brace may include at least two guiding strips with electrically conductive surfaces where guiding features on the strip, such as guiding pads, converge such that the convergence is directed toward the electrically conductive surfaces. At least one collector brace may be for contacting a positive electrode and at least one collector brace may be for contacting a negative electrode, which may be configured to charge a rechargeable device of a vehicle. A charging station may include support fixtures such as a post connected to the charging mount and a stand mechanically connected to the post for support the post and charging mount.

In accordance with another embodiment of the invention, a charging station may include a charging overhang with rigid structural components that is mounted to a charging mount. The charging overhang may include rigid components such as a crossbar, spacing bar, and one or more arms. Rigid or flexible connections may be provided between the rigid components. For example, collector braces on the charging overhang may move relative to the crossbar of the overhang, through a flexible connection.

Another aspect of the invention may be directed to a vehicle, which may be charged by a charging station. The vehicle may include two or more contact plates electrically connected to a rechargeable device of the vehicle. The rechargeable device of the vehicle may be an energy storage system, such as a battery or ultracapacitor. The contact plates may be located on top of the vehicle, and may be positioned relatively parallel to a direction of movement for the vehicle. They may also be spaced apart on the top surface of a vehicle. A first contact plate may be a positive electrode and while a second contact plate may be a negative electrode to charge the rechargeable device.

A system for charging a vehicle may be provided in accordance with another embodiment of the invention. The system may include a charging station with two or more collector braces and a vehicle with two or more contact plates. The collector braces may be configured to receive contact plates on top of the vehicle such that the contact plates slide between electrically conductive surfaces after being guided by guiding strips. The contact plates may be squeezed between the guiding strips to ensure good electrical contact. Furthermore, the electrically conductive surfaces may have a surface area that contacts the contact plates, which may provide an area of electrical contact. Such features may decrease impedance at the charging interface between the charging station and vehicle, which may aid in fast charging. The charging station may also include a spacing bar to keep the collector braces at a desired distance apart from one another, which may match the distance between the contact plates of the vehicle. The charging station may also include a flexible connection for a connecting structure that connects the charging mount and collector braces, which may enable the connecting structure and contact assemblies to move laterally with respect to the direction of vehicle travel. This may provide tolerance for vehicle dimensions, drive path, or other vehicle attributes.

A method for charging a vehicle may be provided in accordance with another embodiment of the invention. The method may include moving a vehicle comprising two or more contact plates to a position below a charging mount of a charging station, where the charging mount has two or more collector braces. An electrical connection may be established between the two or more collector braces and the two or more contact plates of the vehicle. The vehicle may remain electrically connected to a charging station for a period of time to achieve a desired state of charge.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
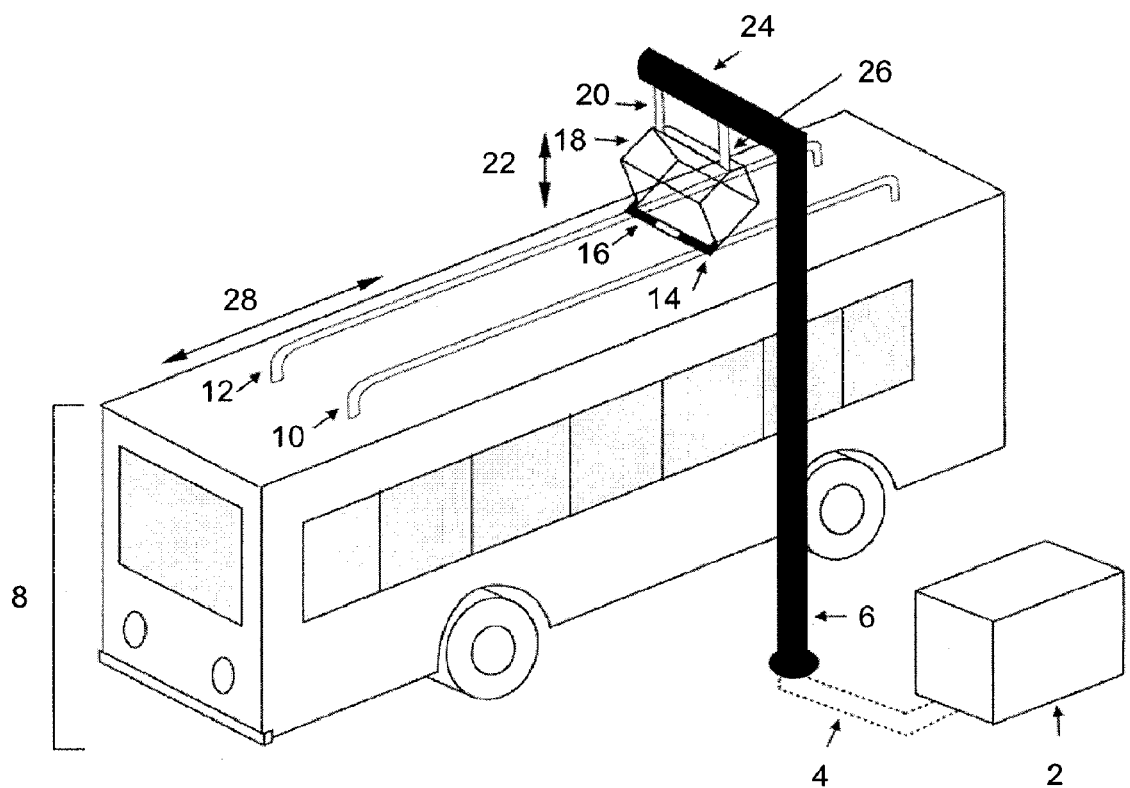
FIG. 1 shows a charging station in accordance with an embodiment of the invention.

The invention provides for systems and methods for charging an electric vehicle. One aspect of the invention provides for a charging station. The charging station can be used to transfer power to an electrically powered vehicle. The charging station may be used to transfer power to any electric vehicle, hybrid electric vehicle, or any other vehicle that may include a propulsion power source, such as a battery, ultracapacitor, or any other energy storage system. In some embodiments, an electrically powered vehicle may be a heavy duty vehicle, such as a bus or truck.

For example, electrical vehicles powered by the system may include a transit bus, a school bus, a delivery van, a shuttle bus, a tractor trailer, a class 5 truck (weighing 16,001-19,500 lbs., two-axle, six-tire single unit), a class 6 truck (weighing 19,501-26,000 lbs., three-axle single unit), a class 7 truck (weighing 26,001-33,000 lbs., four or more axle single unit), a class 8 truck (weighing 33,000 lbs. and over, four or less axle single trailer), a vehicle with a GVWR weighing over 14,000 pounds, a vehicle with a cargo to driver mass ratio of 15:1 or greater, a vehicle with six or more tires, a vehicle with three or more axles, or any other type of high occupancy or heavy-duty vehicle. In some embodiments, a charging station may charge any other electric vehicle, including passenger vehicles. Any discussion herein of electric vehicles or electrically powered vehicles may refer to any type of vehicle discussed and vice versa.

In some embodiments of the invention, the charging station can comprise a charging connection, such as a charging chassis or overhang, suspended from a charging mount for establishing an electrical connection between the charging station and the electrically powered vehicle. The charging connection can comprise a positioning device for controlling the position or orientation of the charging connection.

Another aspect of the invention provides for an electric vehicle comprising contact plates for establishing an electrical connection to a charging station. The contact plates can be positioned on a top surface of the electric vehicle and be positioned in a direction that is relatively parallel to a direction of vehicle movement. The contact plates may be spaced apart on the top surface of the electric vehicle.

The methods of the invention include transferring power to a vehicle using a charging station. Transferring power to the vehicle can comprise positioning the vehicle under a charging mount of the charging station and engaging a charging connection, such as a pantograph, catenary arm, charging chassis or frame, or charging overhang to establish an electrical connection between the charging station and the vehicle.

As shown in FIG. 1, the charging station can comprise a structure (6) with a charging mount (24). A charging connection (18) can be suspended from the charging mount. The charging connection can be a device similar to a components selected from the group consisting of a pantograph, a catenary arm, and a cantilever arm. The charging connection can have an adjustable shape or size such that an electrically conductive surface (14, 16) located on the charging connection can have an adjustable location. In some embodiments of the invention the charging connection is mechanically attached to the charging mount through a coupling, such as a positioning device (20, 26). The positioning device can be fixed or adjustable.

In some embodiments of the invention the charging connection can comprise two electrically conductive surfaces (14, 16), such as conductive pads. The two electrically conductive surfaces can be electrically insulated from each other. The two electrically conductive surfaces can be supplied power through electrical wiring that electrically connects the electrically conductive surfaces to a power source (2). The electrical wiring can be housed within the charging connection (18), positioning device (20, 26), the charging mount (24), and the structure (6). Additional electrical wiring (4) can be used to establish an electrical connection to the power source (2). The power source can comprise any power source described herein.

As shown in FIG. 1, the vehicle (8) can comprise two contact plates or bars (10, 12) extending in a direction of vehicle movement (28). The two bars can be copper bars that are electrically connected to an energy storing device used to power the vehicle.

Figure 2:
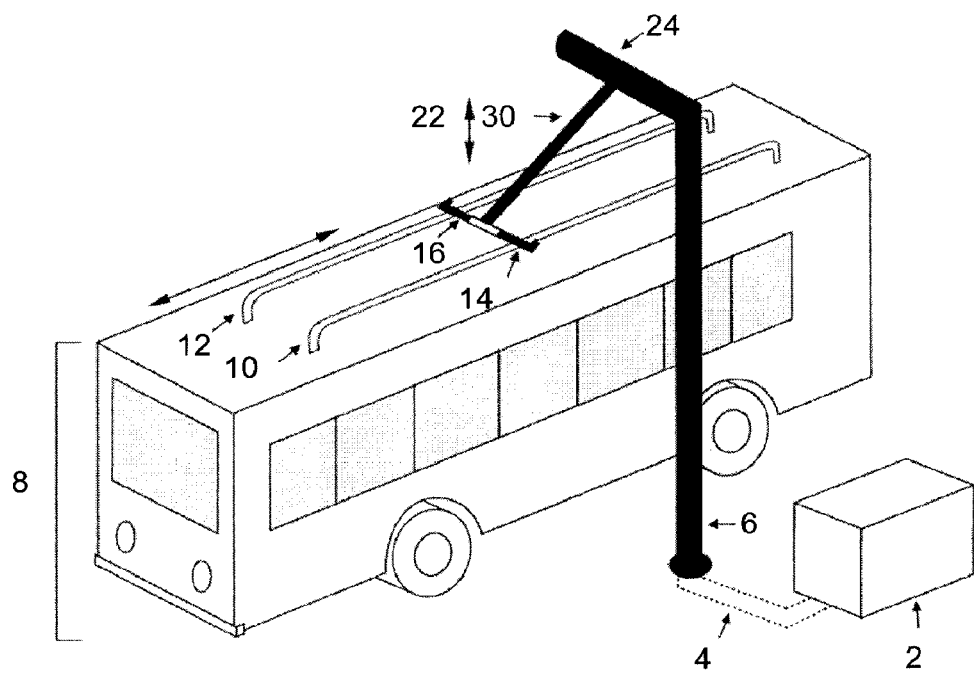
FIG. 2 shows an alternate embodiment of a charging station.

An alternate embodiment of the charging station is shown in FIG. 2. The electrically conductive surfaces (14, 16) can be connected to the charging mount through a cantilever arm (30). The cantilever arm can be adjusted in a vertical direction (22) to allow a vehicle (8) to pass under the conductive surfaces and then for establishing an electrical connection between the conductive surfaces and contact plates or bars (10, 12) on the vehicle. The electrical connections between the conductive surfaces and the power source (2) can be as described in FIG. 1.

Figure 3:
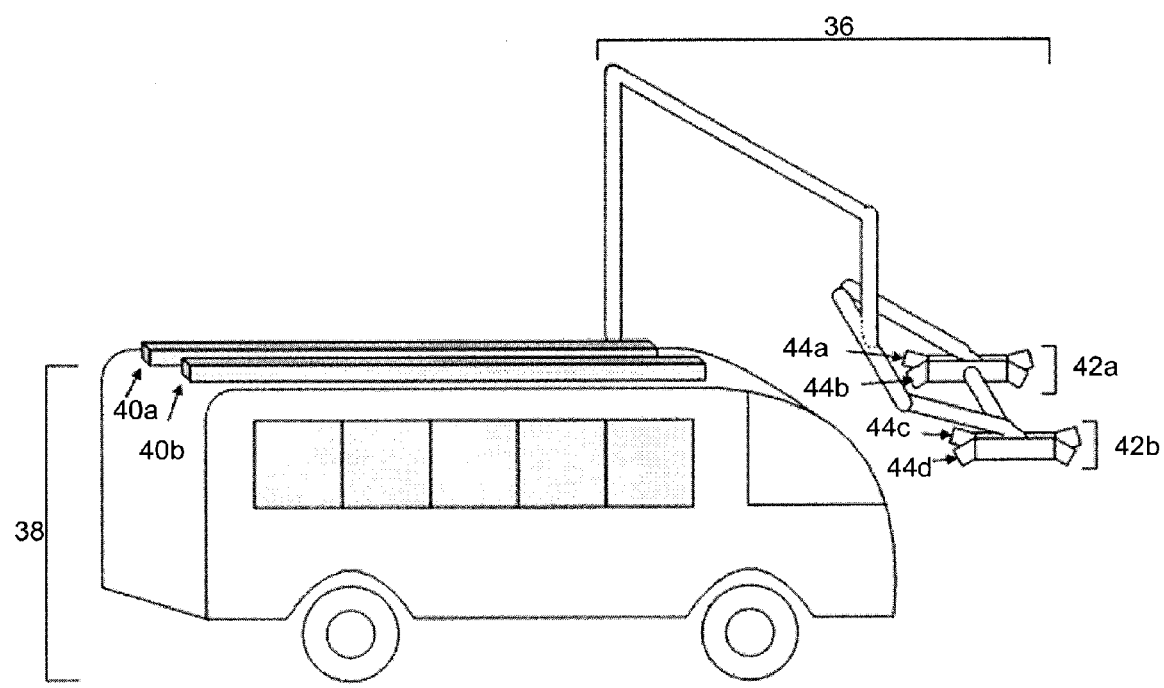
FIG. 3 shows another embodiment of a charging station.

FIG. 3 shows another example of a charging station (36) and a vehicle (38). The vehicle may include one, two, three, four or more charge points, which may be contact bars, plates, or contacts of any other shape. In some embodiments, it may be preferable to have at least two charge points. In other embodiments, larger numbers of charge points may be desirable to charge multiple batteries (e.g., two charge points may be electrically connected to one battery or group of batteries, another two charge points may be electrically connected to another battery or group of batteries). Charging multiple battery sets in parallel may be desirable to speed up charge time and reduce system heating due to high current transfer. Any discussion of charge points or any other contacts may refer to contacts of any shape or format.

Charge points (40a, 40b) may extend parallel to the direction of vehicle movement. In preferable embodiments of the invention, the charge points may be mounted on top of the vehicle, such as on the roof of the vehicle. In some alternate embodiments, the charge points may be mounted on a side of a vehicle, in the roadway, or along another portion of the surface of the vehicle, or combinations thereof. As discussed previously, the charge points may be formed of copper. In some embodiments, the charge points may be formed of any conductive material, including but not limited to aluminum, silver, gold, or alloys or combinations thereof, and/or may be plated or clad with any conductive material including but not limited to copper, aluminum, silver, gold, alloys or combinations thereof, or any other conductive material. The charge points may be electrically insulated from one another. The charge points may be spaced apart from one another on top of the vehicle.

The charging station (36) may include any number of contact assemblies (42a, 42b), such as collector braces. The contact assemblies may be electrically connected to charge points of a vehicle, which may function as electrodes. In some instances, the number of contact assemblies may match the number of charge points (40a, 40b) on the vehicle. For example, if two charge points are provided on the vehicle, two contact assemblies may be provided on the charging station. If four charge points are provided on the vehicle, four contact assemblies may be provided on the charging station.

In some embodiments, a pair of contact assemblies may be provided to make contact with a pair of charge points connected to a battery or battery pack. In some instances, more contact assemblies may be provided (e.g., two contact assemblies may contact a pair of charge points which are in electrical communication with a battery or group of batteries, while two other contact assemblies may contact two other charge points which are in electrical contact with another battery or group of batteries). Charging multiple batteries at the same time may be desirable to speed up charge time and reduce system heating due to high current transfer. In some instances, the multiple contact assemblies may be provided on the same arm of a charging station (e.g., four contact assemblies may be provided on the same overhang), while in other instances the multiple contact assemblies may be provided on a plurality of arms of a charging station (e.g., two contact assemblies may be provided on one overhang, while two contact assemblies are provided on a second overhang).

The contact assemblies may include one or more guiding feature (44a, 44b, 44c, 44d) that may assist with guiding the charge points to contact conductive pads of the contact assemblies.

Charging Stations

A charging station can comprise a charging mount positioned above the ground and a charging connection suspended from the charging mount. The charging connection can be directly attached to the charging mount or attached to the charging mount through a coupling, such as a positioning device. The charging connection can be similar to a device selected from the group consisting of a pantograph, a catenary arm, and a cantilever arm. The charging connection may include, or also be referred to as, a charging chassis or frame, a charging skeleton or girder, or a charging overhang. The charging connection can be an inverted form of a device used to power a light rail car or an electric bus. In other embodiments of the invention, the charging connection is a catenary arm suspended from the charging mount. The catenary arm can be supported by a cantilever arm.

In some embodiments, the charging can be for a two wire trolley bus such that the bus can operate as a trolley bus. For instance, for part of the time, a bus may be operating as a trolley bus by connecting to wires on a grid system. When the bus reaches the end of a grid system, trolley poles may be lowered and the bus may operate as a battery electric bus, independent of the grid. Similarly, a battery electric bus may operate independent of the grid and then encounter the grid. When the bus returns to the grid, the poles may be raised into contact with the grid and the bus may be recharged while operating as a trolley bus. Thus, in accordance with an embodiment of the invention, a bus may operate on the grid part of the time and off the grid part of the time. The bus may optionally use the on-grid time to charge the batteries on the bus, which may be used when the bus is off-grid.

The charging connection may have a sensor or a mechanical or electro-mechanical height adjustment system to allow the charging connection to adjust to a height required to allow a vehicle to drive under the charging connection. The system for height adjustment can include the charging connection and/or the positioning device. The charging connection can be adjusted to a height required to establish an electrical connection.

The electrical connection can be established for a time sufficient to charge the vehicle partially or fully. The charging connection can be designed in such a fashion that it is only activated when an electrical connection is made between the vehicle and the charging station and/or a signal is received from the vehicle to activate charging. The charging station can comprise mechanical and/or electrical protective devices to isolate conductive paths during non-contact situations. Such devices may be configured to allow energy flow only after receiving an electronic message (wireless, proximity switched contact, and/or manual trigger) or via direct mechanical activation.

In alternate embodiments, if the vehicle were to operate part time on-grid as a trolley, energy flow may automatically occur when the vehicle reaches the grid. In some embodiments, a sensor may be provided that may allow the energy flow, while in other embodiments, mechanisms may be provided that may enable energy flow when the vehicle reaches the grid. Safety features may be provided, which may allow energy flow only in a desired manner.

In another embodiment the vehicle (e.g., bus) can adapt to existing light rail systems, where the vehicle is able to connect to the single overhead line and the ground coupling in the roadway rail.

Power can be supplied to the charging connection using any means known to those skilled in the arts. In some embodiments of the invention, an electrical power source used to power an electric vehicle such as a light rail or an electric bus can be used. The electrical power source can be a power source used to supply power to an overhead line for powering an electric train or a bus. The electrical power source can comprise a high voltage DC power source. The voltage can be between 400 and 800 volts DC, between 450 and 750 volts DC, or approximately 600 volts. The power source can be tapped and then transferred to a voltage converter to provide the correct voltage and current flow for the vehicle. The voltage converter can be a DC-DC charger. In other embodiments of the invention, a rapid charger can be used to supply power to the charging connection. The rapid charger can be powered by conventional power sources or alternative power sources. In some embodiments of the invention, the rapid charger is powered by hydrogen, conventional electricity obtained from a power grid, or any other type of power source. The rapid charger can be configured to provide a voltage and current to a vehicle.

The power supply can comprise an energy buffer device. The energy buffer can be a capacitor or a battery. The capacitor can be a large ultra-capacitor. The battery can comprise a battery pack. Use of such a system may allow for off-peak charging of the energy buffer device at lower energy costs, then supply some or all of the daytime energy needs of the charging station. This energy buffer device may also allow the use of lower power infrastructure and/or charging supplies. The energy buffer device may allow for a slow charge of the energy buffer over time, then allow for rapid energy delivery through the charging connection.

The energy buffer device can be utilized for utility grade emergency power or load balancing on a utility grid. Because the energy buffer device may be incorporated into large buildings for emergency power or into the utility grid for power balancing, the system can have cross-functionality and can be a joint project for customers of the services.

The charging station can be located at a hub or any position along the route of a vehicle. In other embodiments of the invention, the charging station is located near an overhead line or an electric railway used to power a light rail vehicle, a train, or an electric bus.

Figure 4:
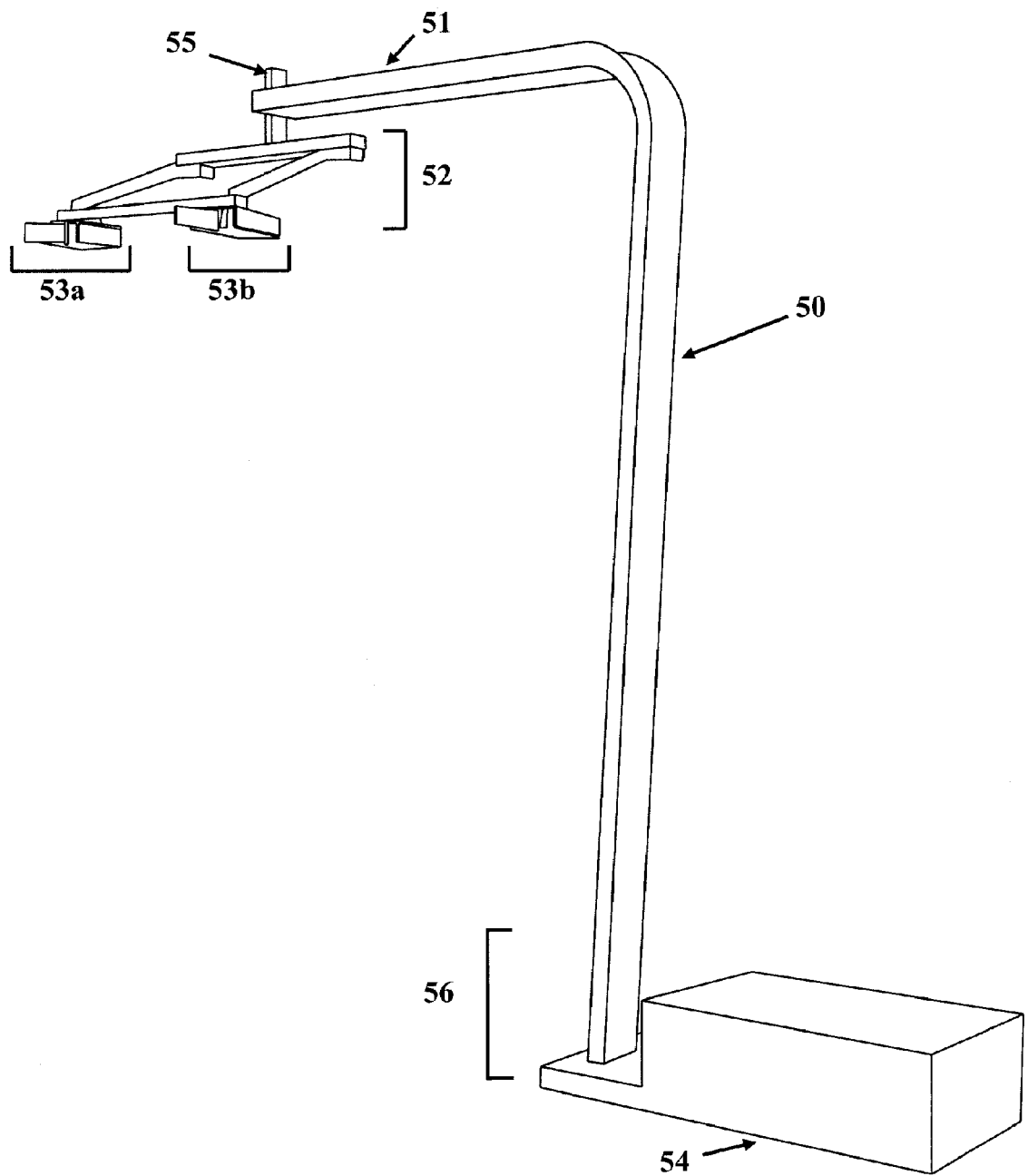
FIG. 4 shows an example of a charging station.

FIG. 4 shows an example of a charging station in accordance with an embodiment of the invention. The charging station may comprise a structure (50) with a charging mount (51). The charging mount may comprise a charging connection (52). The charging connection may hang below the charging mount. The charging connection may extend downward and/or away from the charging mount.

In some embodiments, the charging connection (52) may be connected to a charging mount (51) via a coupling (55). The coupling may be fixed or adjustable. For example, the coupling may be adjustable so that a charging connection may move vertically with respect to the charging mount. For instance, the coupling may be a vertical post with a flexible member such as a spring, an elastic component, a pneumatic device, a magnet, a weight or a gear. The flexible member may enable the charging connection to have a default height which may be adjustable when a force is exerted on it. For example, if a vehicle is passing under the charging connection and encounters a bump, the charging connection may accommodate the bump and maintain electrical contact with the vehicle. Similarly, when vehicles of slightly different height pass under the charging connection, they may be accommodated by a flexible coupling. This may be advantageous in situations where vehicle height may vary due to factors such as tire pressure or load weight.

In some alternate embodiments, the coupling may allow for active adjustment of charging connection height, which may allow the charging station to accommodate vehicles of a wide range of heights. For example, a sensor may be in communication with the coupling to inform the coupling of an incoming vehicle's height.

The charging connection may include one or more contact assemblies (53a, 53b). In some embodiments, a contact assembly may include a pair of guiding strips. A contact assembly may include one or more electrically conductive surfaces, such as a conductive pad, that may make electrical contact with a charge point. In some embodiments, a contact assembly may include two conductive pads that may make electrical contact with a charge point. The charging structure and charging mount may have any structure or form that may enable the contact assemblies to contact the charge points of a vehicle. For example, a charging mount may form a horizontal post or cantilever extending from the charging structure.

In some embodiments, the charging structure (50) may include a vertical post. Alternatively, the charging structure may have any other shape or configuration that may support the charging mount and/or charging connection at a desired height. The charging structure could even be part of a wall or pre-existing structure such as a bus stop waiting station. In some embodiments, the length of the charging structure may be adjustable, which may result in the position of the charging connection being adjustable. The charging structure may be passively adjustable, such as if a vehicle passes beneath the charging connection, and causes the charging structure to accommodate the height of the vehicle. The charging structure may also be actively adjustable, such as if the vehicle approaching the charging station emits a signal indicating the vehicle type or height, so that the charging station may adjust its height to accommodate the incoming vehicle.

In some instances, the charging mount and structure may keep electrical connections from each of the contact assemblies segregated. For example, electrical connections from two contact assemblies may be segregated within a single integrated structure (e.g., a single pole), or the structure may include two components (e.g., two poles) that may house electrical connections for each of the contact assemblies. In some implementations, the charging mount and structure may keep electrical connections from each of the conductive pads within a contact assembly segregated.

The charging station may also include a stand (56). The stand may provide structural support to a charging structure (such as a post) and a charging mount/charging connection. In some embodiments, the stand may be located at or form the base of a support structure of a charging station.

The charging station may also include a power source (54). As discussed previously, the charging station may be powered by conventional power sources or alternative power sources.

Figure 5:
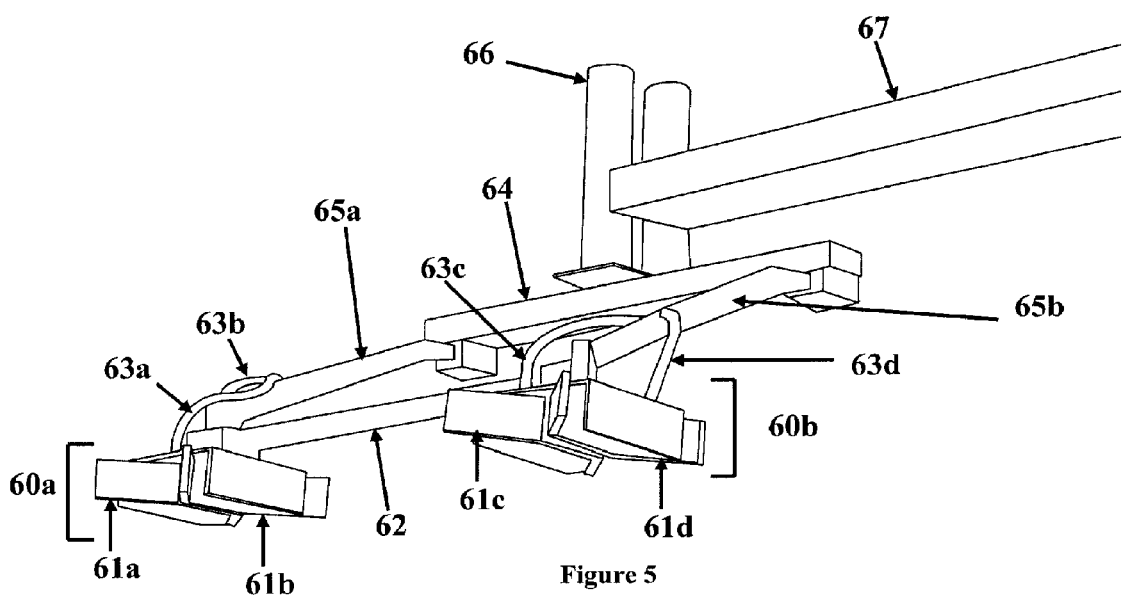
FIG. 5 shows an example of a charging connection of a charging station.

FIG. 5 shows a view of the charging connection. The charging connection may form a charging chassis, charging frame, or charging overhang. The charging connection may include contact assemblies (60a, 60b). Each contact assembly may include one or more guiding feature (61a, 61b, 61c, 61d), such as a guiding strip or guiding slat, that may assist with forming an electrical contact between a charge point on a vehicle and the contact assembly.

The contact assemblies may be spaced at a desired distance apart. For instance, two or more contact assemblies may be spaced at any desired distance apart. For example, the contact assemblies may be spaced about 5 cm, 10 cm, 15 cm, 20 cm, 25 cm, 30 cm, 35 cm, 40 cm, 45 cm, 50 cm, 60 cm, 70 cm, 80 cm or greater or lesser apart. Preferably, the contact assemblies may be spaced at a distance apart that is substantially the same as or closely approximates the distance between charge points on an approaching vehicle.

The charging connection may also include a structure or feature that may keep the contact assemblies at a predetermined distance apart. For example, a spacing bar (62) may be provided which may keep the contact assemblies (60a, 60b) at a predetermined distance apart. The predetermined distance may correspond to the distance between the charge points on the roof of the vehicle. The predetermined distance may be fixed, such that the contact assemblies remain at the same distance apart. Alternatively, the predetermined distance may be flexible. For example, a spring or elastic feature may be provided within the spacing bar (62) such that the spacing bar is a predetermined distance apart at rest, but when force is exerted along the length of the spacing bar, the length of the spacing bar may compress or expand slightly. Such features may enable vehicles with charging points that may be at slightly different distances apart to approach a guiding feature, and then have the spacing bar adjust its length to accommodate the charging points sliding through the contact assemblies (60a, 60b).

In another example, the spacing bar may include features that may enable the length of the spacing bar to be adjusted as desired. For example, different vehicles may have charging points that are spaced apart at different distances. The vehicles may provide a signal to a charging station about the distance between the charging points, so that the charging station can adjust the length of the spacing bar to accommodate the charging point distances. A sensor or a hydraulic, mechanical or electro-mechanical length adjustment system for the spacing bar may be utilized. This may be useful in situations where different makes or models of vehicles may be conductive to charging points being spaced at different distances apart. Any discussion herein of the spacing bar may also apply to any other structure or component that may provide contact assemblies with a fixed or variable/controllable distance between one another.

The charging connection may also include a positioning bar (64). In some embodiments, the positioning bar may be a horizontal bar, which may be connected to a coupling (66), which is connected to a charging mount. Alternatively, the positioning bar may be directed connected to a charging mount. In some embodiments, the positioning bar may be a rigid member of the charging connection. The charging connection may also include one or more arms (65a, 65b) extending from the positioning bar. The arms may be connected to the contact assemblies and/or the spacing bar. In some instances, the arms may extend downward from the positioning bar and/or horizontally away from the positioning bar. In some instances the arms may extend both downward and away from the positioning bar. Preferably, the arms may be rigid members. The arms may be connected to the positioning bar through a flexible connection or a rigid connection. Similarly, the arms may be connected to the contact assemblies and/or spacing bar through a rigid connection or a flexible connection. The positioning bar, spacing bar, and one or more arms may form a chassis or frame for a charging connection. A charging connection with rigid members and one or more flexible connection may form a semi-rigid structure. The semi-rigid charging connection may advantageously provide enough structure and rigidity to orient the contact assemblies to accept charge points from a vehicle, while providing enough flexibility to accommodate variations in charge point placement or vehicle drive orientation.

The charging connection may also include wires (63a, 63b, 63c, 63d) or other electrical connections that may be provided from conductive pads. For example, electrical connections between each of the contact assemblies may be segregated. In some instances, electrical connections between each of the conductive pads may be segregated.

In preferable embodiments of the invention, the contact assemblies may be at substantially the same height. This may accommodate vehicles where the charge points of the vehicles are at substantially the same height. In some alternative embodiments, the contact assemblies may be arranged such that they are at different heights (e.g., 60a may hang lower than 60b), which may accommodate vehicles where the charge points are at different heights (e.g., one contact plate may extend from a vehicle room higher than another).

Figure 6A:
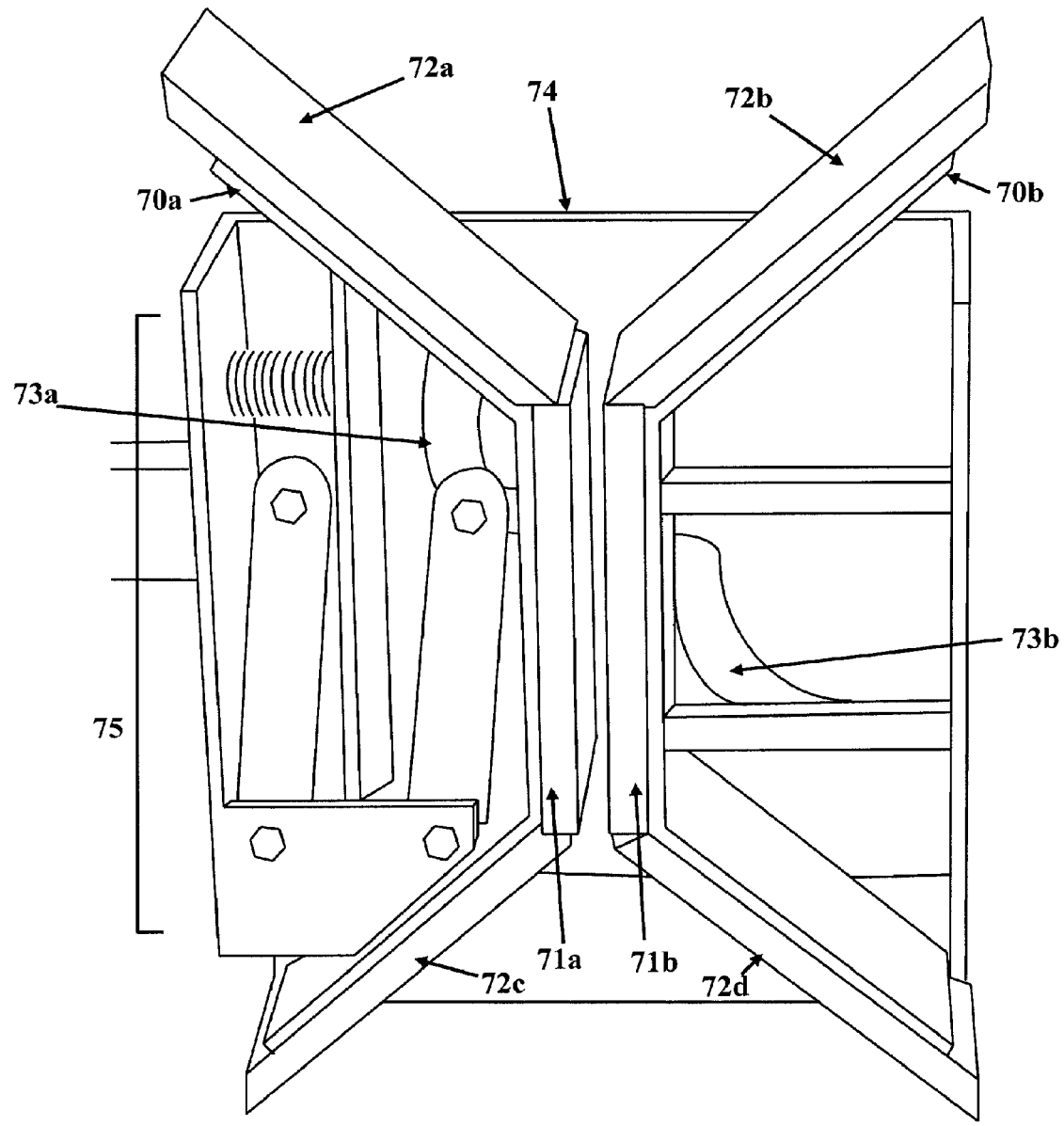
FIG. 6A shows a view of a contact assembly.

FIG. 6A shows a view of a collector brace, which may also be referred to as a contact assembly, and vice versa. The collector brace may include a guiding feature, such as a guiding strip (70a, 70b). The guiding feature may be shaped such that it may capture a charging point, and guide it to one or more contact pads (71a, 71b). A pair of guiding features may form a 'V' shape to capture the charging point, or may have any other shape, such as a "U" shape, or any shape that may have a larger opening that may funnel or guide the charge point to a smaller opening. The guiding features may start off at some distance apart, and then they may converge toward one another at electrically conductive surfaces of the guiding features. This funneling aspect may enable the guiding features to have some tolerance in capturing the charge points from a vehicle. The charge points may be captured at the wide end of the funnel, and be directed toward the electrically conductive surface, which may be spaced closer together.

A guiding feature may include an electrically conductive surface, which in some embodiments may be a contact pad. The contact pads (71a, 71b) may be metallic or non-metallic conductive pads and may or may not be replaceable. A preferable method would be to have replaceable pads that can be changed when the conductive portion is damaged or used. In one example, the contact pads may be conductive carbon pads. Part of the carbon pads may scrape off whenever a charge point slides between the contact pads. In such instances, the carbon pads may be replaceable. In other embodiments, any other conductive materials (such as metals, or metal alloys) may be used. Preferably, the contact pads may be formed of a slippery material that may enable the charge points to slide through easily.

In some embodiments, two or more contact pads may be provided per collector brace. In other embodiments, only one contact pad may be provided per collector brace. Different collector braces may or may not have the same number of contact pads. A charge point may slide between the electrically conductive surfaces of the collector brace, such that the charge point is sandwiched between the electrically conductive surfaces, such as the contact pads. Preferably when the charge point is between the electrically conductive surfaces, the charge point is contacting both contact pads.

In some embodiments, the contact pads may provide an electrically conductive surface area. In some embodiments, the electrically conductive surface area may be 1 sq. cm, 2 sq. cm, 4 sq. cm, 6 sq. cm, 8 sq. cm, 10 sq. cm, 12 sq. cm, 15 sq. cm, 20 sq. cm, 25 sq. cm, 35 sq. cm, 50 sq. cm or greater.

The contact pads may have any shape, such as rectangular, square, circular, oval, triangle, trapezoidal, hexagonal, etc. The contact pads may also have any dimensions. For example, the contact pads may be 0.5 cm long, 1 cm long, 2 cm long, 4 cm long, 6 cm long, 8 cm long, 10 cm long, 12 cm long, 15 cm long, 20 cm long, 25 cm long, 30 cm long, 35 cm long, 40 cm long, 50 cm long, or longer. Similarly, the contact pads may be 0.5 cm wide, 1 cm wide, 2 cm long, 4 cm wide, 6 cm wide, 8 cm wide, 10 cm wide, 12 cm wide, 15 cm wide, 20 cm wide, 25 cm wide, 30 cm wide, 35 cm wide, 40 cm wide, 50 cm wide, or wider. In some embodiments, the contact pads may be longer than they are wide.

In some embodiments, the contact pads may be of a sufficient width to provide leeway in the height of the charge points of a vehicle. For example, if the contact pads have a significant width, they may still contact the charge points of a vehicle, even if the vehicle is slightly shorter or taller than average. The charge points may end up contacting the contact pads toward the top of the contact pads or toward the bottom of the contact pads. Thus, having a substantial surface area to a contact pad may be advantageous in accommodating different vehicle heights, or irregularities in heights of the vehicle that may appear from different features of the terrain, such as bumps in the road.

In some embodiments, the charging station may include a horizontal roller, or similar feature, which may make preliminary contact with the roof mounted charge points (e.g., copper bars) to adjust the height. The horizontal roller, or any other guiding mechanism may be used to make contact with the roof of a vehicle, and provide a reference or guide that may enable the contact pads of the charging station to achieve a desired height. For example, if the vehicle-mounted charge points are about a couple of inches above the vehicle roof, a height guide, such as a roller may be provided several inches below the contact pads, so that when the roller contacts the roof of the vehicle, the height of the contact pads may be adjusted to be at the desired charging height. A horizontal roller may contact the roof of the vehicle, and roll over the roof of the vehicle, which may enable the vehicle to pass underneath without cause any damage to the vehicle. Other comparable mechanisms known in the art may be used, such as a guide that may have a soft slippery surface that may brush over the vehicle roof.

In some embodiments, the entire electrically conductive surface area of the contact pad may be contacting a charge point, such as a side of a contact plate on a vehicle. In preferable embodiments, the surface area contact at the interface between the collector brace of the charging station and the charge point of vehicle may provide increased conductivity and electrical flow between the charging station and the vehicle, which may enable a battery of the device to be fast-charged.

The vehicle may receive a signal when the contact plate on the vehicle makes contact with the contact pad or comes within a collector brace, in accordance with an embodiment of the invention. That signal may take command of the bus and cause it to stop. If the bus were to stop when making electrical contact, the contact plates on the bus would not have to be very long. This may advantageously provide less exposure to an electrically "hot" area.

Thus, it may be advantageous to provide a pair of collector braces and a pair of charge points, so that each collector brace has an electrically conductive surface on both sides of a charge point, such that the surface area connection between the charge point and the collector brace is increased.

The guiding features may also include guiding pads (72a, 72b, 72c, 72d). The guiding pads may be formed of a slippery material that may enable charge points to slide through. In some embodiments, a polymer or plastic may be used for the guiding pads. For example, the guiding pads may be formed of a nylon. In some instances, the guiding pads may include a coating or be clad with a slippery material.

In some embodiments, the guiding pads may be very long, or the contact pads may have a cover extending both fore and aft. The cover may be long enough to ensure that the charge bar on the roof is covered during charging. This may prevent a large bird or something similar from making contact between the two charge bars.

The contact pads (71a, 71b) may be electrically connected to a power source. In some instances, the contact pads may be electrically connected through wires (73a, 73b).

In some embodiments, a charging station may include a pair of collector braces, or more. In some instances, at least one collector brace may be for providing an electrical connection with an anode while at least one other collector brace may be for providing an electrical connection with a cathode, when the collector braces contact the charge points of a vehicle. If there are more than one contact pads in a collector brace, the contact pads may function may be for contacting the same type of electrode. For example, two collector braces may be provided, each comprising two contact pads. Both contact pads in one contact assembly may contact an anode, while both contact pads in the other contact assembly may contact a cathode. In some implementations, different contact pads within the same contact assembly may contact different electrodes. For instance, one collector brace may be provided, and one contact pad may contact a cathode while another may contact an anode.

A collector brace may also include a casing (74). In some instances, a casing may provide support or structure to the collector brace. In some embodiments, a pressure assembly (75) may be provided that may exert force on one or more guiding feature (70a). In some instances, the pressure assembly may exert force on one guiding feature, while the other guiding feature may be fixed. In another instance, two pressure assemblies may be provided, whereby each pressure assembly exerts a force on a guiding feature. The force exerted on a guiding feature may be directed toward another guiding feature. For example, if a pair of guiding features beside one another is provided, one of the guiding features (e.g., 70a) may have a lateral force directed to the other guiding feature (e.g., 70b), such that the guiding features would have a squeezing force. By doing so, the contact pads of each guiding feature is pressed to the charge point when the charge point passes through, which ensures that an electrical connection is made. Furthermore, as previously discussed, by using a large surface area for the contact pads, a large surface area electrical interface may be provided between the contact pads and the charge points. By exerting a sufficient amount of pressure on the connection, the large surface area contact can be ensured, which may ensure a low impedance across the junction.

The pressure assembly may include any mechanism known in the art that may provide a sufficient lateral force between the contact pads to ensure a connection with the charge points (e.g., the contact pads may be pinching together to receive the charge point). In some instances, features such as springs or elastics may be used in the pressure assembly. For example, as shown in FIG. 6A, the pressure assembly may utilize a plurality of springs, that are connected to linkages and a bar that may allow a contact pad (71a) to remain substantially parallel to another contact pad (71b), without directly contacting the other contact pad.

Figure 6B:
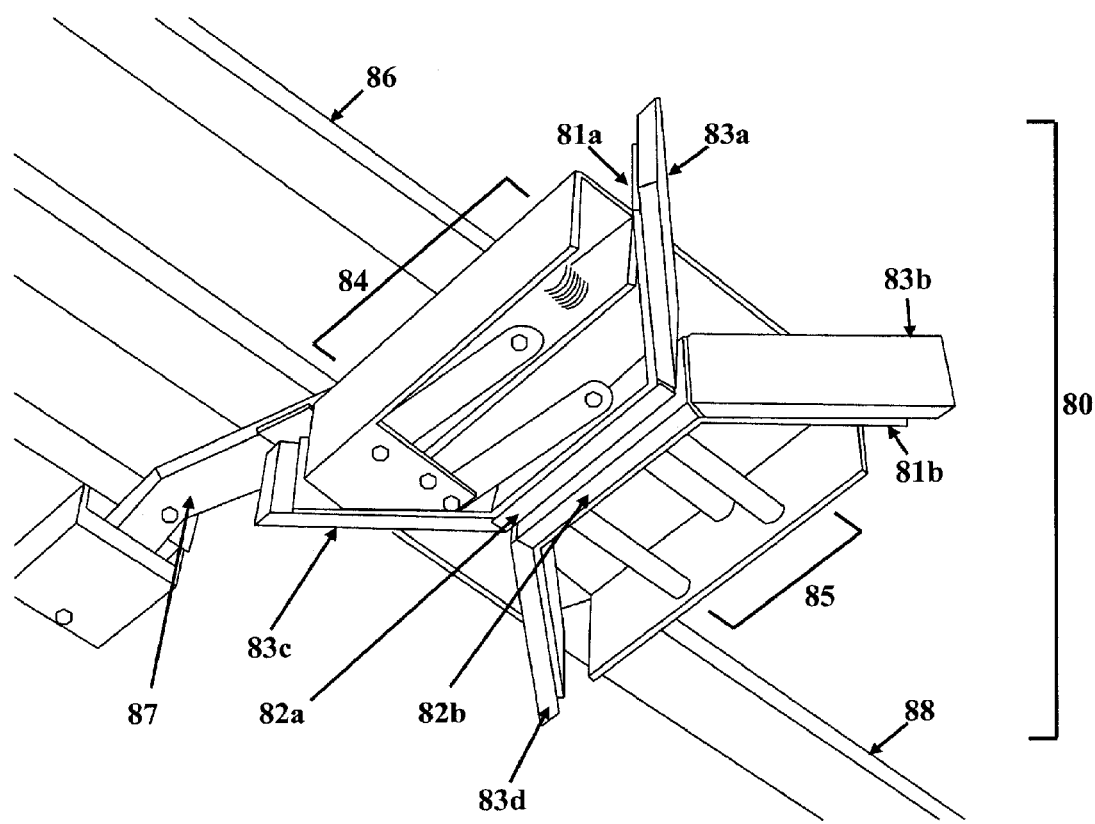
FIG. 6B shows an additional view of a contact assembly.

FIG. 6B shows another view of a contact assembly (80), which may include guiding features (81a, 81b), contact pads (82a, 82b), guiding pads (83a, 83b, 83c, 83d), a pressure assembly (84) which may exert a flexible pressure on one guiding feature (81a), and a fixed assembly (85) which may fix another guiding feature (81b) in place. The contact assembly (80) may also be connected to a spacing bar (86), and/or any other structure (87), such as an arm, that may connect the contact assembly (80) to a charging mount (88).

Figure 6C:
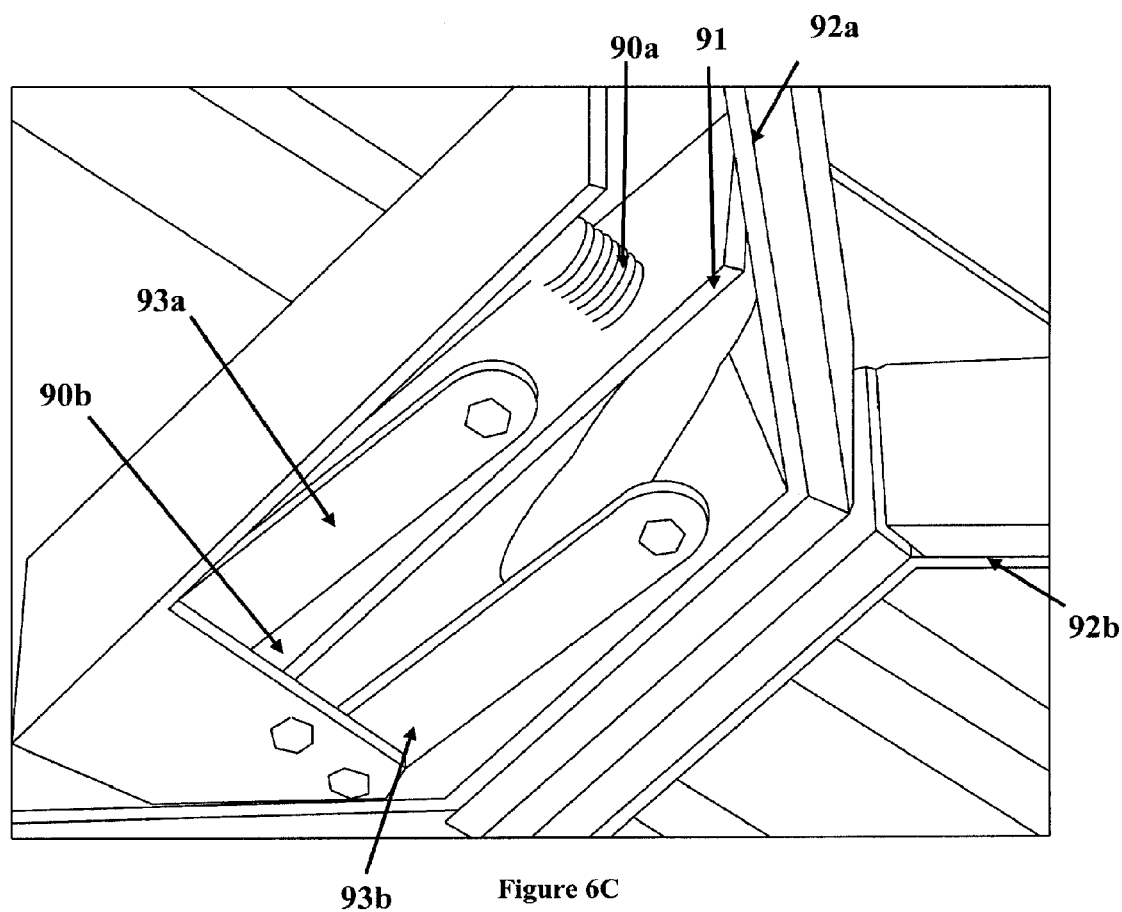
FIG. 6C shows a close up of a pressure assembly in accordance with an embodiment of the invention.

FIG. 6C shows a close up of a pressure assembly in accordance with one embodiment of the invention. The pressure assembly may include multiple springs (90a, 90b) that may be connected to a bar (91) connected to a guiding feature (92a). Linkages (93a, 93b) may also be provided, which may be connected to the bar (91) and/or guiding feature (92a). The pressure assembly may keep the guiding feature (92) substantially parallel to another guiding feature (92b). Furthermore, the pressure assembly or other features or components may prevent the conductive pads from contacting one another.

In some embodiments of the charger connection, there may be a cleaning brush or mechanism which will clean the vehicle rooftop bars as the vehicle enters and/or leaves the charging arm assembly. This may advantageously provide an improved electrical connection.

Figure 7A:
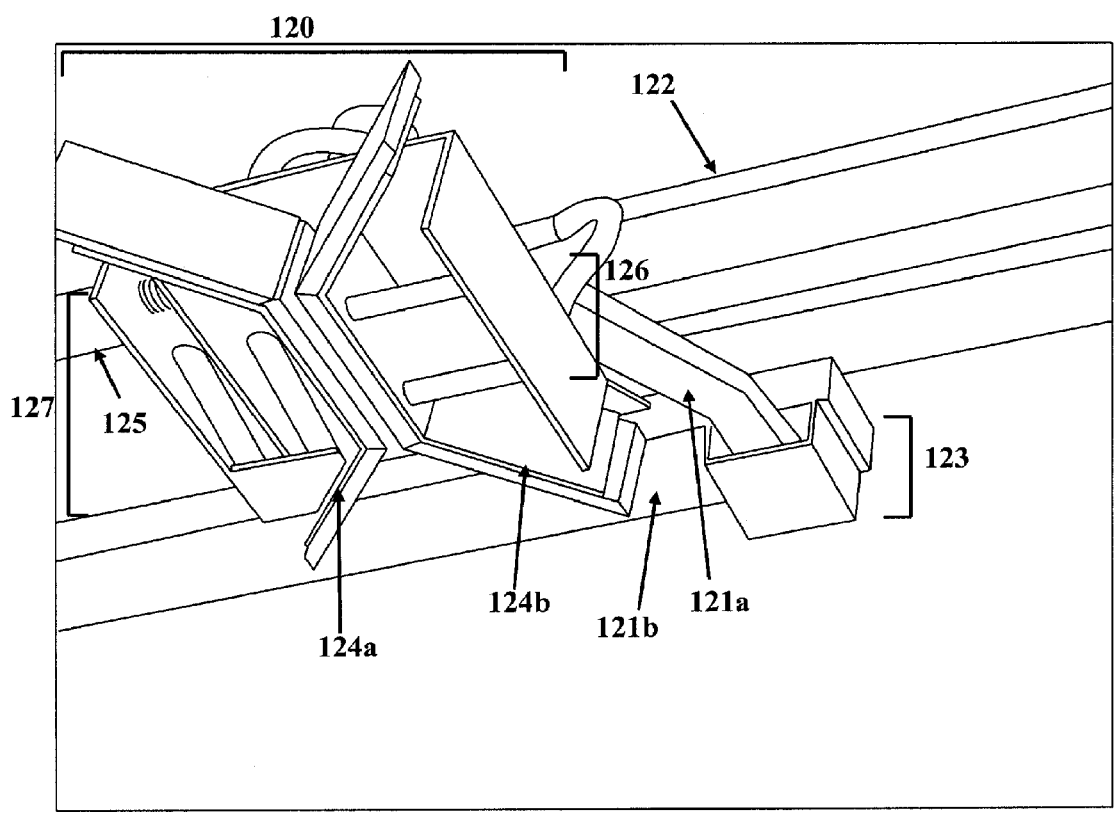
FIG. 7A shows a contact assembly on a charging mount.

FIG. 7A shows part of a charging chassis in accordance with an embodiment of the invention. A contact assembly (120) may be on a connecting structure, such as an arm (121a) and crossbar (121b), that connects the contact assembly to a charging mount (122). The contact assembly may also be connected to a spacing bar (125). The contact assembly may be connected to the spacing bar and/or arm.

The contact assembly may include a fixed assembly (126), which may keep a guiding feature (124b) in place. In some embodiments, a contact assembly may include at least one pressure assembly (127), and at least one fixed assembly. Alternatively, a contact assembly may include a plurality of pressure assemblies. In some instances, a contact assembly may include a plurality of fixed assemblies, although preferably, a contact assembly includes at least one pressure assembly.

The charging chassis may include a flexible connection (123). The flexible connection may be between an arm and a crossbar. The flexible connection (123) may provide flexibility to the connecting structure arm (121b) so that the contact assembly (120) on the arm (121b) may move relative to the charging mount (122) to accommodate the placement of one or more charge point on a vehicle. For example, a vehicle may be driven to a charging station and placed so that one or more charge points is slightly offset from one or more contact assemblies. Guiding features (124a, 124b) of a contact assembly may capture a charge point of a vehicle, and the flexible connection (123) may enable to the contact assembly to shift to follow the path of the vehicle. The flexible connection (123) may allow the contact assembly (120) to shift substantially perpendicularly with respect to the direction of the vehicle travel. The contact assembly may be shifting laterally or horizontally. Thus, if a vehicle were driven beneath a charging station, a flexible connection may enable flexibility within the connection structure that may enable one or more contact assemblies to move sideways relative to the vehicle to capture and contact one or more charge point of the vehicle.

Figure 7B:
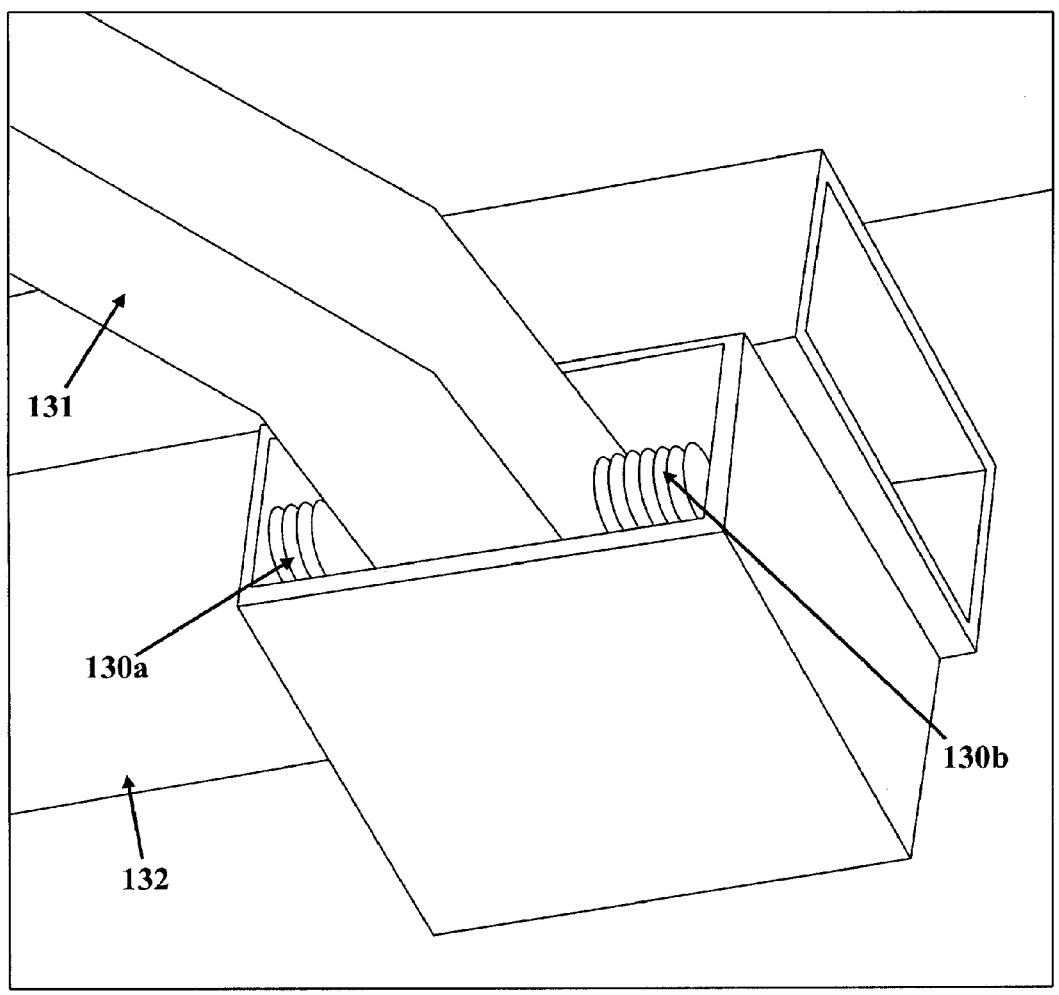
FIG. 7B shows an example of a flexible connection of a connecting structure.

FIG. 7B shows an example of a flexible connection of a connecting structure. The flexible connection may have any design that may provide flexibility to a connecting structure including springs, elastics, hinges, linkages, pivot points, pneumatic devices, weights, gears, hydraulics, or any other structure for flexible connection. For example, springs (130a, 130b) may be provided that may enable a portion of a connecting structure to move laterally. A bar (131) of a connecting structure may slide sideways with respect to a fixed portion of the connecting structure (132). The portion of the connecting structure may move laterally, which may enable one or more contact assembly to move laterally to capture a charge point of a vehicle. The flexible connection may enable contact assemblies to return to a center position, and may utilize springs, hydraulics, or gravity to recenter the connection assembly after use.

In some embodiments, a flexible connection may be structured such that a bar of a connecting structure may swing back and forth, which may allow a contact assembly to swing back and forth. For example, the bar may swing back and forth if a pivot point or hinge is provided. Features such as springs, elastic, hydraulics, or gravity, may be used to enable the bar to swing back to its original position at rest. In other embodiments, the flexible connection may be provided that may enable a bar (131) to swing rotatably around a connecting structure (132). For example, the bar may pivot a little around the connecting structure, which may enable a contact assembly at the end of the bar to move vertically with respect to the connecting structure. In some embodiments, there may be some give between the bar and the connecting structure that may result in limited vertical movement of the contact assembly.

Vehicles

The vehicle can comprise two contact plates positioned on a top surface of the vehicle. The vehicle can comprise two bars attached to the roof of the vehicle. In some embodiments of the invention, the two bars are conductive and function as contact plates for establishing a connection between the vehicle and a charging station. The two bars can be copper bars or any other type of conductive material. Other types of conductive material may include but are not limited to copper, aluminum, silver, gold, or alloys or combinations thereof, or may be plated/clad with a conductive material. In some instances, the bars may be formed of the same materials, while in others, different materials may be utilized for different bars. The bars may be formed of materials that may be resistant to corrosion. Furthermore, the bars may be formed of materials that are slippery or high in lubricity. In some embodiments of the invention, the bars are similar in fashion to a luggage rack on an SUV. The two bars or contact plates can extend in a direction that is parallel to a direction of vehicle movement. As shown in FIG. 1, FIG. 2, and FIG. 3, the two bars (10, 12) can establish contact with a charging connection anywhere along the length of the bars. The orientation of the bars can reduce the need to align the vehicle in a forward or backward direction prior to charging the vehicle.

There may be mechanical and/or electrical protective devices on board the vehicle to isolate conductive paths during non-contact situations. Such devices may be configured to allow energy flow only after receiving an electronic message (wireless, proximity switched contact, and/or manual trigger) or via direct mechanical activation.

The bars may also be installed at a prescribed gap height above the vehicle roofline to ensure any pooled water and/or other temporary or permanent conductive matter is kept at an appropriate dielectric gap height relative to the voltage differential.

The vehicle may have a gauge or screen on the dash to inform a driver of the vehicle as to the state of charge of the vehicle. The vehicle can comprise a display for indicating that charging is in progress.

The vehicle can comprise a charge monitoring device that can communicate charge status and vehicle rapid charge capabilities to other regional charging stations for characterization of energy availability. This monitoring system can be used for predictive modeling to estimate energy available at one or more charging stations on a route. The route can be fixed, controlled using GPS guidance, or spontaneous. The monitoring system can be used to determine how much energy the vehicle can collect during time available at a charging station. The vehicle can comprise a system for predicting range based on charge status, energy availability, and predicted energy availability obtained by transfer of charge from upcoming charging stations. In some embodiments of the invention, a vehicle that is running behind schedule can skip or limit time spent at a charging station based on a prediction of energy required to reach at a subsequent energy station and/or the energy available at a subsequent energy station. In other embodiments of the invention, a route can be modified based on energy available at one or more charging stations.

In some embodiments of the invention, the vehicle comprises a fast-charging energy storage device. The fast-charging energy storage device can be lithium titanate batteries or any other type of battery known to those skilled in the arts. The vehicle can be an electric bus or electric hybrid bus comprising the fast-charging energy storage device.

Figure 8:
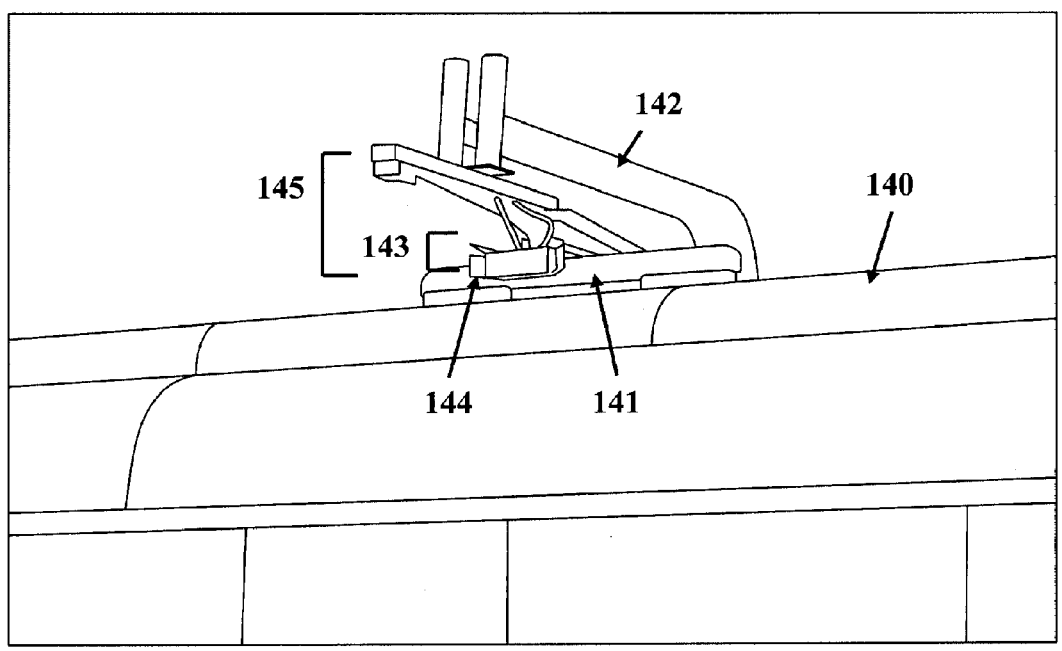
FIG. 8 shows an example of a vehicle with a contact bar.

FIG. 8 shows an example of a vehicle (140) with at least one contact bar (141). The vehicle may pass under a charging station, which may include a charging mount (142). A contact bar may pass through a contact assembly (143). The contact assembly may include a guiding feature (144) that may guide the contact assembly to receive the contact bar. The charging station may also include a connecting structure (145) that may be flexible to enable lateral movement of the contact assembly, to allow the contact assembly to receive the contact bar (141).

In some embodiments, one or more contact bar of a vehicle may be a vertical plate with a rounded top. In some embodiments, this may advantageously allow for charging during icing conditions. In some embodiments, a contact bar may be shaped such that it has two or more contact points with a vehicle. For example, as shown in FIG. 8, a contact bar (141) may have to contact points with a vehicle roof toward the front and end of the contact bar. In other embodiments, a contact bar may have one contact with a vehicle roof. For example, an entire length of a contact bar may be contacting a vehicle roof. Any number of contact points may be provided between a contact bar and a vehicle.

A contact bar may have any dimensions that may enable it to be attached to a vehicle. For example, in some embodiments, a contact bar may be about 1 cm, 5 cm, 10 cm, 20 cm, 30 cm, 50 cm, 80 cm, 100 cm, 120 cm, or 140 cm long or longer. A contact bar may be about 0.5 cm tall, 1 cm tall, 2 cm tall, 3 cm tall, 4 cm tall, 5 cm tall, 7 cm tall, 10 cm tall, or 15 cm tall or taller. In some embodiments a contact bar may be sufficiently tall such that there may be some flexibility in allowing for a contact between the contact bar and a contact assembly of a charging station. For example, a contact bar may be sufficiently tall so that the electrically conductive surfaces of a contact assembly may still contact the contact bar even if there are some variations in height, such as through bumps in the road, or different vehicle heights.

A contact bar may also have any thickness. For example, a contact bar may be about 0.2 cm thick, 0.5 cm thick, 0.7 cm thick, 1 cm thick, 1.5 cm thick, 2 cm thick, 3 cm thick, 4 cm thick, 6 cm thick, or thicker. A contact bar may be sufficiently thick such that when it passes between a contact assembly, both sides of the contact bar may contact guiding strips of the contact assembly, preferably along electrically conductive surfaces of the guiding strips. A contact may also be sufficiently thick such that when the contact bar passes between the guiding strips, a sufficient amount of pressure is exerted on the contact bar to ensure a strong electrical connection, and a lowered impedance. The amount of pressure may also be sufficient to ensure that the entire electrically conductive surface area is contacting the contact bar, and not just a portion of the surface. Preferably, the thickness of the contact bar is a little greater than the space between the electrically conductive surfaces of a contact assembly when at rest. This may ensure that the guiding strips of a contact assembly may sufficiently grip, press, squeeze, clamp, or hold a contact bar to provide a sturdy electrical contact, while still allowing the contact bar to slide between the guiding strips.

Two or more contact bars may also be spaced apart on the roof of the vehicle. The contact bars may be spaced at any desired distance apart. For example, the contact bars may be spaced about 5 cm, 10 cm, 15 cm, 20 cm, 25 cm, 30 cm, 35 cm, 40 cm, 45 cm, 50 cm, 60 cm, 70 cm, 80 cm or greater or lesser apart. Preferably, the contact bars are substantially parallel to one another.

Methods

Transit buses can operate on a repetitive route system whereby the bus repeats its route at least every hour. As such, it passes the transit bus can pass a common point on an hourly basis and wait at that point for a cue to repeat the route. This can involve a wait of 10 to 20 minutes in many cases. The methods of the invention provide for a transit bus that can utilize the wait time to charge the transit bus. The transit bus can comprise a fast charging energy storage device that can completely recharged in 10 minutes. In some instances, the transit bus can be completely or substantially (e.g., more than 75%) charged within 5 minutes, 3 minutes, 2 minutes, or 1 minute. The fast charging energy storage device can be lithium titanate batteries or one of several other battery chemistries.

In some embodiments of the invention, an energy storing device is only partially charged. Partially charging the energy storing device can increase the life of the energy storing device by reducing the amount of charge transferred to the energy storage device during a single charging procedure. For example, an electric transit bus designed in accordance with the invention described herein can average 11 to 13 miles per hour and consume approximately 1.5 to 3.0 kWh/mile. If the electric transit bus comprises an energy storing device with approximately 56 kWh of capacity, the electric transit bus can contain sufficient energy to propel the electric transit bus for approximately two to four hours without charging depending on driving application. That can allow for the electric transit bus to run indefinitely with an hourly charging of approximately 25% of the capacity of the energy storing device. This charging procedure can increase the life of the energy storing device relative to a charging procedure that charges the energy storing device from a completely drained state.

In some embodiments of the invention, a vehicle is charged by positioning the vehicle under a charging station. The charging station can comprise a charging connection that is engaged by adjusting the position of the charging connection. A control device in the vehicle can be used to transmit instructions to the charging station and/or the charging connection to establish an electrical connection between the charging connection and the vehicle.

In some embodiments of the invention, the charging connection may comprise a pair of contact assemblies with a known distance between them that correspond to the distance between the charge points on the roof of the vehicle. These charge contacts can use a system to return them to a center position that may utilize springs, hydraulics, or gravity to recenter the connection assembly after use.

In one example, the contact assembly may comprise conductive pads with guides to ensure that the assembly moves laterally or vertically with respect to the direction of travel of the vehicle. To reduce complexity, the entire assembly may be energized if the support structure for the assembly can insulate voltages greater than the transmitted voltage. The contact pads may be metallic or non-metallic conductive pads and may or may not be replaceable. A preferable method would be to have replaceable pads that can be changed when the conductive portion is damaged or used. By using a spring contact and a large surface area with respect to the amount of current transferred, the assembly can ensure a low impedance across the junction. In some embodiments, guidance into charge clamping devices can be accommodated by electronic guidance device aligned by laser or similar detection devices.

The vehicle and/or energy storage controls system may be able to monitor vehicle route timetable performance. If there is excess time available for recharge, the controls systems can elect to reduce charger power and/or current to match the available break time in the route. As such there may be an increase in efficiency and system lifetime as a result of modulated charging performance.

In some alternative embodiments, a charging station may also function as a discharger. For example, if a vehicle has a large amount of stored energy (e.g., in an on-board battery or energy storage unit), it may be desirable to discharge the vehicle somewhat, and transfer that energy to an energy storage unit of a charging station, or to provide it to a utility. A charging station may be able to operate both to charge and discharge a vehicle.

The systems and methods may utilize or incorporate any methods, techniques, features or components known in the art or previously utilized. See, e.g., U.S. Pat. No. Re 29,994; U.S. Pat. No. 3,955,657; European Patent Application No. EP 2 014 505 A1; European Patent Application No. EP 1 997 668 A1; PCT Publication No. WO 2008/107767 A2; U.S. Patent Publication No. 2008/0277173; PCT Publication No. WO 2009/014543, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A charging station for a vehicle comprising:
a charging chassis, including a pair of collector braces to charge the vehicle, each collector brace formed with spaced apart guiding strips with an electrically conductive surface, wherein the conductive surfaces of the pair of collector braces are for contact with a pair of electrodes of the vehicle, and mechanically connected to a charging mount and extending downward and away from the charging mount,
wherein the guiding strips provide the position and orientation of the pair of collector braces;
a post mechanically connected to the charging mount; and
a stand mechanically connected to the post and supporting the post and charging mount.

2. The charging station of claim 1, wherein the guiding strips of a collector brace form at least one pair of converging surfaces.

3. The charging station of claim 2, wherein each collector brace comprises a forcing component for providing a force to a guiding strip of the collector brace, wherein the force is directed toward another guiding strip of the collector brace.

4. The charging station of claim 3, wherein the forcing component includes at least one of the following: a spring, an elastic component, a pneumatic device, a magnet, a weight, or a gear.

5. The charging station of claim 1, wherein an electrically conductive surface of a first collector brace is configured to contacts a positive electrode of the vehicle and an electrically conductive surface of a second collector brace is configured to contacts a negative electrode of the vehicle when the vehicle is engaged with the charging station.

6. The charging station of claim 1, wherein the electrically conductive surfaces have a surface area of 8 $cm^2$ or greater.

7. The charging station of claim 1, further comprising a spacing bar separating the pair of collector braces.

8. The charging station of claim 7, wherein the charging chassis is connected to a charging mount via a coupling.

9. The charging station of claim 8, wherein the charging chassis includes a positioning bar connected to the coupling, and at least one arm connected to the positioning bar and connected to a collector brace or the spacing bar.

10. The charging station of claim 1, further comprising a component selected from the group consisting of an energy storage device, a power converter, and a communication device.

11. A vehicle comprising:
a battery; and
a pair of elongated contact plates having a surface area for electrical contact and positioned on a top surface of the vehicle,
wherein the pair of contact plates are electrically connected to the battery,
wherein the pair of contact plates are raised extending from the top of the vehicle and are oriented relatively parallel to a direction of movement for the vehicle and are spaced apart along the top surface of the vehicle, and
wherein one contact plate is a positive electrode and another contact plate is a negative electrode for electrically connecting to a power source to charge the battery.

12. The vehicle of claim 11, wherein the contact plates are formed of vertical plates with a rounded top.

13. The vehicle of claim 11, wherein the contact plates are formed with a conductive material on both sides of the plates.

14. The vehicle of claim 11, wherein the vehicle comprises a communication device.

15. A charging station comprising:
a charging overhang with rigid structural components that is mounted to a charging mount and extending downward and away from the charging mount,
wherein the charging overhang includes a pair of collector braces mounted to a crossbar, each collector brace of said pair formed with spaced apart guiding strips with an electrically conductive surface, and
wherein the crossbar is configured to expand or compress, thereby permitting the collector braces to be movable with respect to one another; and
a vertical support structure mechanically connected to the charging mount and supporting the charging mount and charging overhang.

16. The charging station of claim 15, wherein the collector braces move horizontally with respect to the crossbar.

17. The charging station of claim 15, wherein the charging overhang further includes a pair of arms connected to the collector braces, wherein the arms and the crossbar are formed of a rigid material.

18. The charging station of claim 15, wherein the charging overhang is mounted to a charging mount via a coupling.

19. The charging station of claim 18, wherein the coupling is flexible and enables the charging overhang to move vertically with respect to the charging mount.

20. The system of claim 15, wherein the collector braces are mounted to the crossbar with a flexible connection such that the collector braces are movable with respect to the crossbar, and wherein the flexible connection includes at least one of the following: a spring, an elastic component, a pneumatic device, a magnet, a weight, or a gear.

21. The system of claim 15, wherein the collector braces are each formed with spaced apart guiding strips with an electrically conductive surface for contact with an electrode.

22. The system of claim 21, wherein the guiding strips are configured to provide a squeezing force between the guiding strips, such that the guiding strips of a first collector brace are for providing a squeezing force to a positive electrode, and the guiding strips of a second collector brace are for providing a squeezing force to a negative electrode.

23. A method for charging a vehicle comprising:
   moving the vehicle comprising two or more raised contact plates to a position below a charging mount,
   wherein the charging mount is connected to two or more collector braces, each collector brace with a pair of guiding strips; and
   establishing an electrical connection between a first collector brace and a first contact plate, and between a second collector brace and a second contact plate, wherein the electrical connection is established when the first contact plate is between the guiding strips of the first collector brace, and the second contact plate is between the guiding strips of the second collector brace.

24. The method of claim 23, wherein establishing the electrical connection comprises contacting an electrically conductive surface area of a guiding strip to an electrically conductive surface of a contact plate mounted on a top surface of the vehicle.

25. The method of claim 24, wherein the contact plate is squeezed between at least two guiding strips, such that the electrically conductive surface area of a first guiding strip contacts a first side of the contact plate, and the electrically conductive surface area of a second guiding strip contacts a second side of the contact plate.

26. The method of claim 23, further comprising monitoring a charge status of the vehicle.

27. The method of claim 26, further comprising communicating the charge status of the vehicle to a central station, a charging station, or another vehicle.

\* \* \* \* \*